Sept. 30, 1947.                R. W. JENSEN                2,428,280
                       CONTROL DEVICE FOR OIL COOLERS
            Filed Aug. 5, 1944                 3 Sheets-Sheet 1
Fig. 1
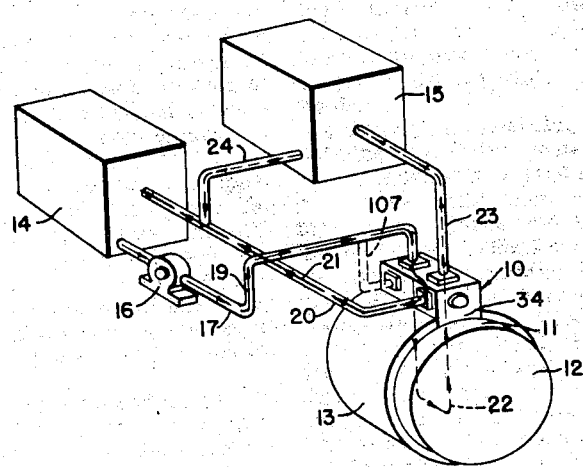
Fig. 2a
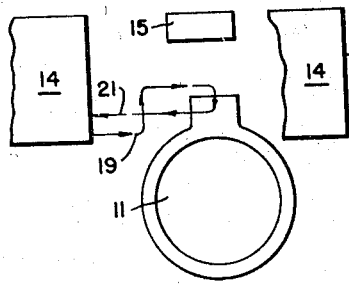
Fig. 2b
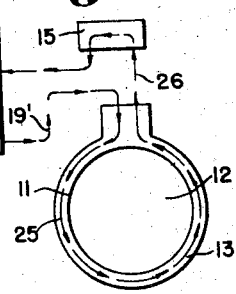
Fig. 2c
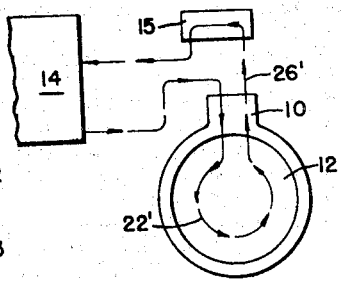
Fig. 8
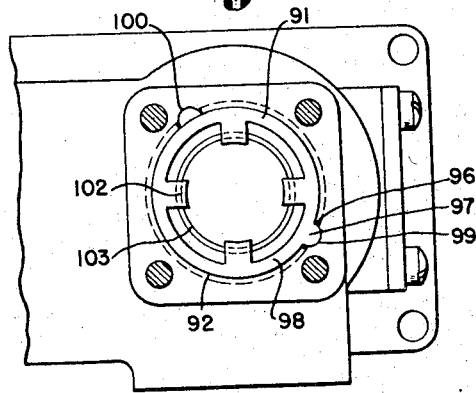
Inventor
RAYMOND W. JENSEN
Attorney Sept. 30, 1947.   R. W. JENSEN   2,428,280
CONTROL DEVICE FOR OIL COOLERS
Filed Aug. 5, 1944   3 Sheets-Sheet 2

Inventor
RAYMOND W. JENSEN
By
Attorney

Sept. 30, 1947.  R. W. JENSEN  2,428,280
CONTROL DEVICE FOR OIL COOLERS
Filed Aug. 5, 1944  3 Sheets-Sheet 3
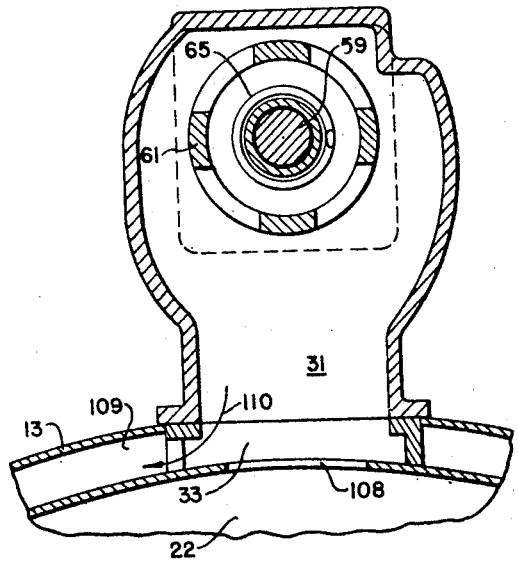
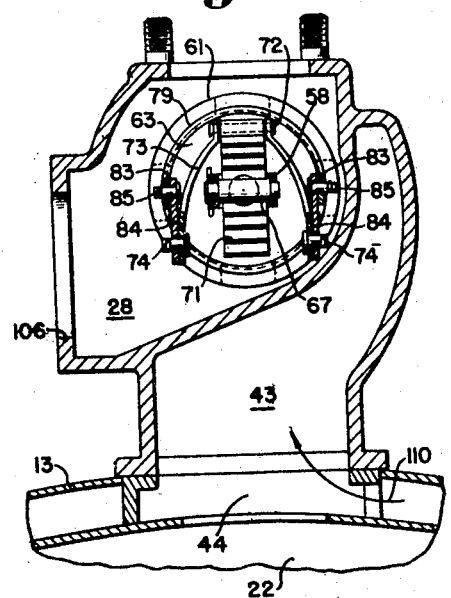
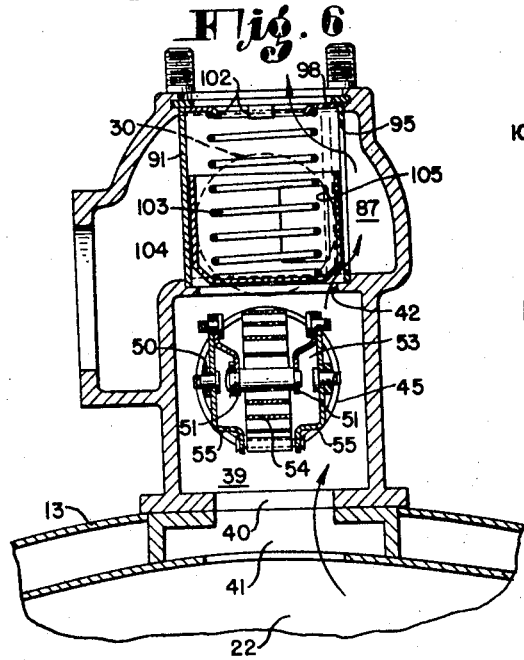
Inventor
RAYMOND W. JENSEN
By
Attorney Patented Sept. 30, 1947

2,428,280

UNITED STATES PATENT OFFICE 2,428,280

CONTROL DEVICE FOR OIL COOLERS

Raymond W. Jensen, Los Angeles, Calif., assignor to The Garrett Corporation, Airesearch Manufacturing Company division, Los Angeles, Calif., a corporation of California Application August 5, 1944, Serial No. 548,220

8 Claims. (Cl. 236—34)

My invention relates to equipment for cooling the oil which is used for crankcase lubrication of internal combustion engines. This oil serves a dual function. It lubricates moving parts, and also absorbs heat. It is a practice, especially where internal combustion engines are employed in aircraft, to circulate the hot engine oil through an oil cooler to remove therefrom the heat which has been absorbed from the engine parts.

It is an object of the present invention to provide a flow control unit which may be connected to an oil cooler to provide a means whereby the piping of the engine oil circulating system may be connected to the cooler and whereby the flow of oil in the circulating system may be controlled so as to travel through different paths in accordance with different temperatures and pressures in the oil.

It is also an object of the invention to provide a flow control unit for an oil cooler which may be installed in an oil circulating system in accordance with a number of different plans of location and connection of the oil circulating conduits.

A further object of the invention is to provide a unit which may be connected to an oil cooler having an inlet to receive the oil and an outlet through which oil is discharged, this unit having therein means for controlling the flow of oil, so that when the oil in the engine is cold, it will be diverted directly from the inlet to the outlet, and therefore the cold oil will not be forced through passages associated with the cooler. In addition to the foregoing the device has therein means controlled by a thermostat for directing warm or hot oil from the engine into passages associated with the cooler. Also, the invention provides a bypass, which may be in heat-exchange relation to the cooler and means for controlling the flow of oil through this bypass.

A further object of the invention is to provide in this oil flow control unit an arrangement whereby the cold oil from the engine is directed back to the engine without passing through the cooler, and wherein the warm or hot oil from the engine is passed through the cooling chambers of the cooler and is then delivered to piping which will carry the cooled oil to a reservoir.

A further object is to provide a control of the character set forth in the preceding paragraphs which may be readily converted at the location of its use so that it may be installed in the system wherein all of the oil received from the engine is ultimately discharged into a pipe leading to a reservoir.

A further object of the invention is to provide a flow control having a simple thermostatic valve device in its inlet chamber for directing the oil from the engine either to the outlet or into the inlet of the cooler or to the cooler inlet and the inlet of a warm up passage associated with the cooler after which a thermostatic means associated with the warm up passage and the outlet of the cooler determines the flow through the warm up passage and the interior of the cooler.

A further important object of the invention is to provide a control unit having a wide usefulness which is simple and compact, and includes cooperating parts which, though efficient in their operation, may be manufactured relatively rapidly and economically.

Further objects and advantages of the invention will be brought out in the following part of the specification.

Referring to the drawings which are for illustrative purposes only,

Fig. 1 is a schematic perspective view showing a manner in which the invention may be employed to connect an oil cooler into an engine oil circulating system including an oil reservoir.

Fig. 2a is a diagram showing the flow of engine oil under one condition.

Fig. 2b is a diagram showing the flow of engine oil under another condition.

Fig. 2c is a diagram showing the flow of engine oil under a third condition, referred to as the normal operation of the cooler.

Fig. 4 is a cross section taken as indicated by the line 4—4 of Fig. 3.

Fig. 5 is a cross section taken as indicated by the line 5—5 of Fig. 3.

Fig. 6 is a cross section taken as indicated by the line 6—6 of Fig. 3.

Fig. 8 is a fragmentary plan view taken as indicated by the line 8—8 of Fig. 3.

Figure 3:
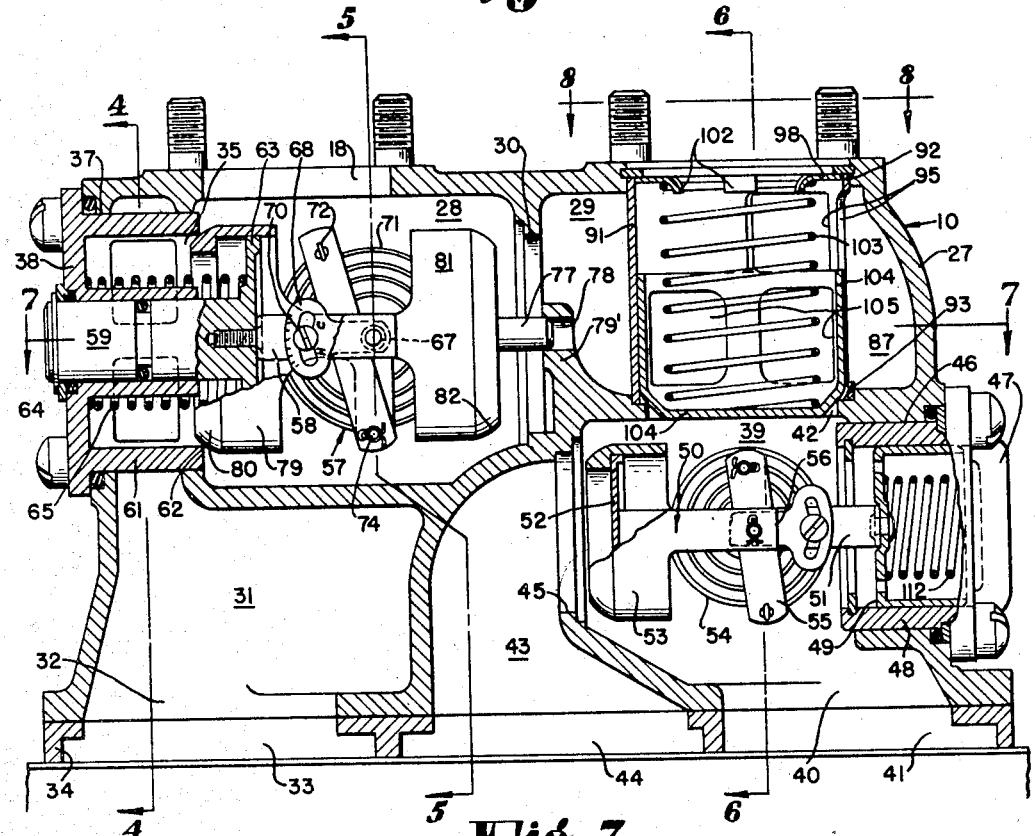
Fig. 3 is an enlarged longitudinal section through the control, this view showing the fitting on the upper part of the cooler, by which connection of the control to the cooler is made.

In Fig. 1 I show my control unit 10 mounted on an oil cooler 11 having a cooling section 12 of cylindric form and having around the cooling section 12 a hollow annular muff 13 comprising a warm up chamber. An engine 14 and a reservoir 15 are respectively schematically indicated. Oil from the engine is delivered by a pump 16 through a pipe 17 to an inlet opening 18, Fig. 3, in the top of the control unit 10. The flow of oil through the piping 17 is indicated by arrows 19. If the oil is cold, as occurs when the engine is started after a period of non-use, the control unit 10 diverts the oil from the cooler 12 back to the engine through a direct return pipe 20 as indicated by the heavy arrows 21. After the engine has heated the oil, the control unit ultimately acts to direct the oil through the body or cooling section 12 of the cooler 11, as indicated by dotted arrows 22, and then through outlet piping 23 to the reservoir 15 from which the cooled oil passes to the engine as needed through piping 24.

The preferred form of the invention is adapted to control the flow of oil from the engine as indicated in Figs. 2a, 2b, and 2c. As shown in Fig. 2a, when the oil from the engine as indicated by arrows 19, is cold, such oil is diverted directly back to the engine, as indicated by arrows 21. As shown in Fig. 2b, after the oil from the engine, as indicated by arrows 19', has warmed up, such oil, prior to the warming up of the cooler section 12 of the oil cooler 11, is passed through the muff or warm up space 13 as indicated by arrows 25, and is then delivered through the reservoir 15 back to the engine 14, as indicated by arrows 26. As indicated in Fig. 2c, after the cooling section 12 of the cooler has warmed up, the control unit 10 acts to discontinue the flow of oil through the warm up passage 13, and to direct the oil through the cooling section 12, as indicated by arrows 22', after which the oil passes back to the reservoir, as indicated by arrows 26'. Additional valuable functions of the control unit 10 include the closing of valves automatically so as to entirely isolate the cooler 11 from the pressure piping in event that an excess pressure develops in the piping 17, and should an excessive back pressure be developed in the cooling section 12 against relatively free flow of the oil as indicated in Fig. 2c, the oil will be diverted from the interior of the cooler section 12, through the bypass formed by the muff 13, so that the oil will then flow as indicated by arrows 25 in Fig. 2b, until the cooling section 12 has warmed up sufficiently to permit a normal flow through the cooling section, as indicated by the arrows 22' of Fig. 2c.

As shown in Fig. 3, the control unit 10 comprises a shell 27 having in the upper part thereof an inlet chamber 28 and an outlet space 29 in juxtaposition and connected by a valve opening 30. Below the inlet chamber 28 there is a cooler inlet space 31 having in the lower part thereof a cooler inlet port 32 for connection to the inlet space 33 of the cooler 11, formed within the fitting 34 of the cooler. The cooler inlet space 31 extends upward along the leftward end of the inlet chamber 28 and is connected through the inlet chamber 28 through a valve opening 35. In the end wall 36 of the shell 27 there is an opening 37 to receive a fitting 38 which will be hereinafter described.

In the shell 27, below the outlet space 29, there is a cooler outlet chamber 39 which communicates through a port 40 with the cooler outlet 41, and which communicates with the outlet space 29 through an intercommunicating valve port 42. Between the space 31 and the chamber 39 there is a bypass space 43, the lower end of which communicates with the muff outlet 44 and the upper portion of which communicates with the outlet chamber 39 through a valve opening 45. In the outer wall of the shell 27 opposite the valve opening 45 there is an opening 46 arranged to be closed by a cap 47 having a cylindrical wall 48 which extends into the opening 46, and is axially aligned with the valve opening 45. This cylindric wall 48 receives in slidable relation the base 49 of a thermostatic valve device 50 which is constructed as shown in my copending application, Serial No. 519,159, filed January 21, 1944, now Patent No. 2,405,831, dated August 13, 1946. It comprises a support 51 which projects from the base 49 toward the valve opening 45 and has on the forward end thereof a plate or piston 52 of approximately the same diameter as the valve opening 45 and in spaced relation to the opening 45. A cylindric valve element 53 is slidable on the piston 52 from the position in which it is shown in Fig. 3, leftward into a position wherein the valve opening 45 will be closed. The movement of the cylindric valve element 53 on the piston 52 is accomplished by a bi-metallic thermostat element 54 made in the form of a spiral. The inner end of the thermostat 54 is connected to the support 51 and the outer end of the thermostat 54 is connected through lever means 55 with the projecting portion 56 of the cylindric valve element 53, and the thermostat 54 acts in response to a rise in its temperature to move the cylindric valve element 53 leftward so as to close the valve opening 45. Accordingly, when the oil which contacts the thermostat 54 is cold, as may occur under various circumstances, the thermostat 50 will retain the valve element 53 in its open relation to the valve opening 45 so that oil may flow through the bypass space 43 through the valve opening 45 into the chamber 39 and outward through the intercommunicating port 42 and the outlet space 29.

In the inlet chamber 28 there is a thermostatic valve device 57 for controlling the flow of oil through the valve openings 30 and 35. This valve device 57 comprises a support 58 which includes a plunger 59 slidable in the bore 60 of the fitting 38. The fitting 38 has a perforate cylindric wall 61 which projects through the opening 37 and across the upper portion of the cooler inlet space 31 as shown in Fig. 3, and forms an annular seat 62 in the opening 35. The plunger portion 59 of the support 58 has on its inner end a circular plate or piston 63 of approximately the same diameter as the opening through the valve seat 62. A snap ring 64 on the outer end of the plunger 59 limits the inward movement of the plunger 59 and a compression spring 65 disposed between the end of the fitting 38 and the piston 63, urges the piston 63 inward to a position spaced from the valve seat 61. The support 58 includes also a bifurcated member 66 axially aligned with the plunger 59 and carrying in rotatable relation a pin 67 which may be rotated for purpose of adjustment by a lever 68 which is fixed on the outer end of the pin 67 and has therein an arcuate slot 69 through which a clamping screw 70 projects for the purpose of securing the lever 68 in selected positions of adjustment. A thermostat element 71 comprising a coil of bi-metallic thermostat material has its inner end fixed on the pin 67. The thermostat element 71 is disposed between the two sides of the bifurcated member 66 and has its outer end secured by means of a cross pin 72 to a pair of levers 73, which are curved and have their opposite ends connected by means of a pivot pin 74 to arms which project from the bifurcated supporting member 66 in a direction opposite the outer end of the thermostatic element 71. Change in temperature of the thermostat element 71 causes the outer end thereof to move and swing the levers 73 on the pivot pin 74. Adjacent the end of the support 58 nearest the valve opening 30 there is a second piston 76 having a diameter substantially the same as the diameter of the valve opening 30. This piston 76 has a stem 77 which is received in an opening 78 in an arm 79 which projects inward toward the center of the opening 30 from one side thereof, the opening 78 being coaxial with the plunger 59. The piston 76 is supported in a position spaced from the valve opening 30.

Figure 7:
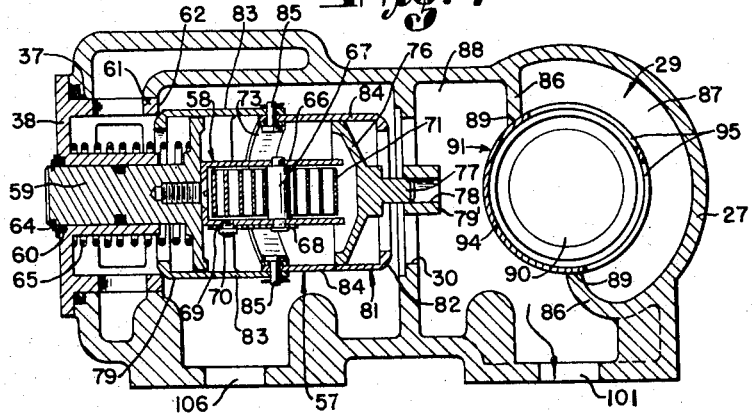
Fig. 7 is a longitudinal section taken as indicated by the line 7—7 of Fig. 3.

A cylindric valve element 79 is slidable on the piston 63 in closely fitting relation thereto. This cylindric valve element 79 has an annular end portion 80 to cooperate with the seat 62 so as to close the valve opening 35 as shown in Fig. 3. On the piston 76 there is a second cylindric valve element 81 having an annular end portion 82 to cooperate with the opening 30 for the purpose of closing the same. From the cylindric valve elements 79 and 81 arms 83 and 84 extend into overlapping relation as shown in Fig. 7. These arms or extensions 83 and 84 are connected by means of pins 85 to the central portions of the levers 73 so that when the levers 73 are swung by the thermostat element 71, the valve elements 79 and 81 will be simultaneously moved in the same direction. When the oil in the inlet chamber 28 is cold, the thermostat element 71 will hold the cylindric valve element 75 in a position to close the first valve opening 75 and will hold the second cylindric valve element 81 in a position to open the second valve opening 30 of the chamber 28. When the oil in the chamber 28 warms up to a temperature near the normal operating range, the response of the thermostat 71 will move the valve elements 79 and 81 rightward from the positions in which they are shown in Fig. 3, so as to open the first valve opening 35 and close the second valve opening 30 of the chamber 28.

As best shown in Fig. 7, a pair of walls 86 extend inward from the side wall of the outlet space 29 so as to divide this outlet space 29 into a first outlet compartment 87 and a second outlet compartment 88. The inner vertical edges 89 of the walls 86 define a gate 90 connecting the compartments 87 and 88. A cylindric partition member 91 is provided to close the gate 90 so that the compartments 87 and 88 may be selectively isolated, one from the other. This cylindric partition member 91 is insertable through a first outlet opening 92 which leads into the outlet space 29 through the upper wall thereof and extends into engagement with an annular channel 93 formed around the intercommunicating port 42. When the partition member 91 is positioned as shown in Fig. 7, a continuous wall portion 94 thereof closes the gate 90, and openings 95 in the wall of the partition member 91 connect the interior of the cylindric partition member 91 with the compartment 87. As shown in Fig. 8, the upper end of the cylindric partition member 91 has therein a shallow notch 96 through which a tongue 97 projects from a spring retaining ring 98 into a recess 99 formed in the wall surrounding the outlet opening 92. Accordingly, the position of the tongue 97 determines the position of the cylindric partition member 91. The wall of the shell 27 surrounding the opening 92 has a second recess or depression 100 to receive the tongue 97. The cylindric member 91 may be rotated on its axis so as to bring the notch 96 at its upper end into alignment with the recess 100, and the ring 98 may be then turned so that its tongue 97 will extend through the notch 96 into the recess 100 so as to hold the cylindric member 91 in a second position, wherein the openings 95 will connect the compartment 88 with the interior of the cylindric member 91, with the compartment 87 and with the outlet opening 92. As shown in Fig. 7, the shell 27 has a second outlet opening 101 leading out through the side wall of the outlet space 29 so as to communicate with the compartment 88.

The spring retaining ring 98 has inwardly projecting fingers 102 to engage the upper end of a compression spring 103 which exerts downward pressure against a cup shaped check valve member 104 which is vertically slidable in the lower portion of the cylindric member 91 and cooperates with the intercommunicating port 42 so as to prevent a reverse flow therethrough. The valve member 104 has windows 105 in the side wall thereof. In addition to the upper inlet opening 18, the inlet chamber 28 has a second laterally directed inlet opening 106, so that connection to the inlet chamber 28 may be made either from above or from the side, as may be required by space considerations in the mounting of the cooler within an aircraft. It will be understood that the inlet opening not used will be covered by a plate. In Fig. 1 the oil inlet piping 17 is shown connected in full lines to the upper inlet opening 18, and as indicated by dotted lines 107, the inlet piping may be connected to the chamber 28 through the laterally directed inlet opening 106, shown in Figs. 5 and 7.

The partition member 91 is shown disposed in Figs. 3 and 7 so that the control unit may be employed in an oil circulating system such as shown in Fig. 1. The thermostatic valve devices 50 and 57 are shown in Fig. 3 in the positions which they assume when the oil in the control unit 10 is cold. At this time the first valve opening 35 of the chamber 28 is closed and the second valve opening 30 is open. Likewise, the valve opening 45 is open due to the fact that both the thermostatic elements 71 and 54 are exposed to relatively low temperature. The oil which enters the chamber 28 from the piping 17 of Fig. 1 may flow directly through the valve opening 30 into the second compartment 88 from which it will pass through the outlet 101 into the direct return piping 20, connected to the engine. As the oil is warmed up in consequence of the operation of the engine, the thermostat element 71 will act to move the valve elements 79 and 81 in rightward direction so as to open the first valve opening 35 and close the second valve opening 30, so that the inlet oil will be directed into the inlet space 31 which, as shown in Fig. 4, communicates through the cooler inlet space 33 of the fitting 34 with the cooler inlet opening 108 and with one end of the muff interior 109. If the oil in the cooling space 12 of the cooler is quite cold at this time, there will be some resistance to the flow of oil through the cooling section 12 and the oil moving downwardly from the inlet space 31 will naturally follow the path of least resistance which is through the interior space 109 of the muff 13 as indicated by arrows 110 of Figs. 4 and 5. Since the valve element 53, Fig. 3, is in retracted position, the oil may flow upward from the space 44 through the bypass 43 and through the valve opening 45 into the cooler outlet chamber 39. The pressure of this oil will lift the valve 104 and the oil will then flow upward through the first compartment 87 and through the first outlet opening 92 to the piping 23, Fig. 1, which will carry the oil to the reservoir 15. The path of flow of oil at this time will be as indicated schematically in Fig. 2b.

The warm oil, passing through the muff 13, as indicated by arrows 110 of Figs. 4 and 5, will transmit heat to the oil in the cooling section 12 so as to warm this oil and permit a movement thereof. At this time, then, oil will start to flow through the inlet opening 108 of the cooling section 12, through the passages of this cooling section and then out through the cooling section through the outlet 41 and the outlet chamber 39. This warm oil will act upon the thermostat element 54 to cause it to move the valve element 53 into a position to close the valve opening 45 and shut off the flow through the bypass 43. The entire flow of oil will be thereafter through the cooling space of the cooler and through the reservoir 15 as shown schematically in Fig. 2c.

If, during the operation of the cooling system, as shown in Fig. 2c, there should be a sudden reduction in temperature in the cooling section 12 of the cooler so that congealment of oil therein will create a back pressure, the pressure build up in the bypass will act against the piston 52, Fig. 3, to force the entire valve device 50 in rightward direction against the pressure of a spring 112 which is disposed between the base 49 and the end wall of the cap 47. This will shift the valve element 53 rightward so as to open the valve opening 45 and permit oil to bypass through the muff 13 until the condition of congealment of oil in the cooling section 12 of the cooler has been corrected. Also, should an excess pressure be built up in the inlet chamber 28 for any reason, such pressure will act leftward against the plunger 59 to move the thermostatic valve device 57 leftward, thereby closing the first valve opening 35 and opening the valve opening 30, so that the inlet chamber 28 will be cut off from the space 31 which communicates with the cooler and permit a direct return of oil through the opening 30 and the second compartment 88 to the piping 20 which leads to the engine 14.

Should it be desired to direct all of the oil from the valve device 10 through the pipe 23 to the reservoir 15, the outlet 101, Fig. 7, may be closed by cover plate and the cylindric partition 91, Figs. 3 and 7, may be rotated into a position wherein the compartment 88 will be connected with the compartment 87. Then, any oil which passes from the chamber 28 through the valve opening 30, and all oil which passes through the valve opening 42, will be conducted through the piping 23 to the reservoir 15.

I claim as my invention:

1. In a flow control for an oil cooler having an inlet and an outlet for the oil, the combination of: walls forming an inlet chamber connected through a valve opening to a cooler inlet port arranged for connection to the cooler inlet, an outlet space connected to said inlet chamber through a second valve opening, a cooler outlet chamber connected to said outlet space through an intercommunicating port and having a cooler outlet port arranged to connect said outlet chamber with said outlet of said cooler, and bypass means to provide communication between said cooler inlet port and said cooler outlet chamber; a valve device in said inlet chamber comprising supporting means having a first piston spaced from and aligned with said first valve opening, a second piston spaced from and aligned with said second valve opening, a first cylindric valve element slidable on said first piston and having an annular end portion to close said first valve opening, a second cylindric valve element slidable on said second piston and having an annular end portion to close said second valve opening, and thermostat means on said support and exposed to the heat of the oil in said inlet chamber for moving said first valve element toward said first valve opening in response to a decrease in the temperature of the oil in said inlet chamber and for moving said second valve element toward said second valve opening in response to an increase in the temperature of said oil in said inlet chamber; means operating in response to excess pressure in said inlet chamber to move said first valve element into closed relation to said first valve opening; and thermostat valve means in said outlet chamber operative in response to a rise in temperature in said outlet chamber to close said bypass means.

2. In a flow control for an oil cooler having an inlet and an outlet for the oil, the combination of: walls forming an inlet chamber connected through a valve opening to a cooler inlet port arranged for connection to the cooler inlet, an outlet space connected to said inlet chamber through a second valve opening, and a cooler outlet port for connecting said outlet space to the outlet of the cooler; a valve device in said inlet chamber comprising supporting means having a first piston spaced from and aligned with said first valve opening, a second piston spaced from and aligned with said second valve opening, a first cylindric valve element slidable on said first piston and having an annular end portion to close said first valve opening, a second cylindric valve element slidable on said second piston and having an annular end portion to close said second valve opening, and thermostat means on said support and exposed to the heat of the oil in said inlet chamber for moving said first valve element toward said first valve opening in response to a decrease in the temperature of the oil in said inlet chamber and for moving said second valve element toward said second valve opening in response to an increase in the temperature of said oil in said inlet chamber; and means operating in response to excess pressure in said inlet chamber to move said first valve element into closed relation to said first valve opening.

3. In a flow control for an oil cooler having an inlet and an outlet for the oil, the combination of: walls forming an inlet chamber connected through a valve opening to a cooler inlet port arranged for connection to the cooler inlet, an outlet space connected to said inlet chamber through a second valve opening, a cooler outlet chamber connected to said outlet space through an intercommunicating port and having a cooler outlet port arranged to connect said outlet chamber with said outlet of said cooler, and bypass means to provide communication between said cooler inlet port and said cooler outlet chamber; a valve device in said inlet chamber comprising supporting means having a first piston spaced from and aligned with said first valve opening, a second piston spaced from and aligned with said second valve opening, a first cylindric valve element slidable on said first piston and having an annular end portion to close said first valve opening, a second cylindric valve element slidable on said second piston and having an annular end portion to close said second valve opening, and thermostat means on said support and exposed to the heat of the oil in said inlet chamber for moving said first valve element toward said first valve opening in response to a decrease in the temperature of the oil in said inlet chamber and for moving said second valve element toward said second valve opening in response to an increase in the temperature of said oil in said inlet chamber; means including said first piston operating in response to excess pressure in said inlet chamber to move said first valve element into closed relation to said first valve opening; and thermostat valve means in said outlet chamber operative in response to a rise in temperature in said outlet chamber to close said bypass means.

4. In a flow control for an oil cooler having an inlet and an outlet for the oil, the combination of: walls forming an inlet chamber connected through a valve opening to a cooler inlet port arranged for connection to the cooler inlet, an outlet space connected to said inlet chamber through a second valve opening, and a cooler outlet port for connecting said outlet space to the outlet of the cooler; a valve device in said inlet chamber comprising supporting means having a first piston spaced from and aligned with said first valve opening, a second piston spaced from and aligned with said second valve opening, a first cylindric valve element slidable on said first piston and having an annular end portion to close said first valve opening, a second cylindric valve element slidable on said second piston and having an annular end portion to close said second valve opening, and thermostat means on said support and exposed to the heat of the oil in said inlet chamber for moving said first valve element toward said first valve opening in response to a decrease in the temperature of the oil in said inlet chamber and for moving said second valve element toward said second valve opening in response to an increase in the temperature of said oil in said inlet chamber; and means including said first piston operating in response to excess pressure in said inlet chamber to move said first valve element into closed relation to said first valve opening.

5. In a flow control for an oil cooler having an inlet and an outlet for the oil, the combination of: walls forming an inlet chamber connected through a valve opening to a cooler inlet port arranged for connection to the cooler inlet, an outlet space connected to said inlet chamber through a second valve opening, a cooler outlet chamber connected to said outlet space through an intercommunicating port and having a cooler outlet port arranged to connect said outlet chamber with said outlet of said cooler, and bypass means to provide communication between said cooler inlet port and said cooler outlet chamber; a valve device in said inlet chamber comprising supporting means having a first piston spaced from and aligned with said first valve opening, a second piston spaced from and aligned with said second valve opening, a first cylindric valve element slidable on said first piston and having an annular end portion to close said first valve opening, a second cylindric valve element slidable on said second piston and having an annular end portion to close said second valve opening, and thermostat means on said support and exposed to the heat of the oil in said inlet chamber for moving said first valve element toward said first valve opening in response to a decrease in the temperature of the oil in said inlet chamber and for moving said second valve element toward said second valve opening in response to an increase in the temperature of said oil in said inlet chamber; means operating in response to excess pressure in said inlet chamber to move said first valve element into closed relation to said first valve opening and move said second valve element into open relation to said second valve opening; and thermostat valve means in said outlet chamber operative in response to a rise in temperature in said outlet chamber to close said bypass means.

6. In a flow control for a cooler having an inlet and an outlet for the oil, the combination of: walls forming an inlet chamber having an inlet opening to receive oil to be cooled and a cooler inlet port for connecting said chamber to the cooler inlet, an outlet space consisting of a first compartment and a second compartment connected by a gate, an intercommunicating port through which connection of said first compartment with said cooler outlet is made, there being a first outlet opening for said first compartment disposed in the wall of said outlet space opposite said intercommunicating port, and there being a valve opening connecting said inlet chamber and said second compartment and a second outlet opening leading from said second compartment; a cylindric partition member connecting said intercommunicating port with said first outlet opening, said partition member having a wall extending across said gate so as to isolate said first compartment from said second compartment; a check valve in said cylindric partition member to cooperate with said intercommunicating port to prevent a reverse flow through said intercommunication port; and valve means responding to relatively low temperature in said chamber to open said valve opening and responding to relatively high temperature in said chamber to close said opening.

7. In a flow control for a cooler having an inlet and an outlet for the oil, the combination of: walls forming an inlet chamber having an inlet opening to receive oil to be cooled and a cooler inlet port for connecting said chamber to the cooler inlet, an outlet space consisting of a first compartment and a second compartment connected by a gate, an intercommunicating port through which connection of said first compartment with said cooler outlet is made, there being a first outlet opening for said first compartment disposed in the wall of said outlet space opposite said intercommunicating port, and there being a valve opening connecting said inlet chamber and said second compartment and a second outlet opening leading from said second compartment; a cylindric partition member rotatable on its axis and connecting said intercommunicating port with said first outlet opening, said partition member having a wall extending across said gate so as to isolate said first compartment from said second compartment and an opening adjacent said wall which will connect said second compartment with the interior of said cylindric partition member when the same is rotated on its axis; a check valve in said cylindric partition member to cooperate with said intercommunicating port to prevent a reverse flow through said intercommunicating port; and valve means responding to relatively low temperature in said chamber to open said valve opening and responding to relatively high temperature in said chamber to close said opening.

8. In a flow control for a cooler having an inlet and an outlet for the oil, the combination of: walls forming an inlet chamber having an inlet opening to receive oil to be cooled and a cooler inlet port for connecting said chamber to the cooler inlet, an outlet space consisting of a first compartment and a second compartment connected by a gate, an intercommunicating port through which connection of said first compartment with said cooler outlet is made, there being a first outlet opening for said first compartment disposed in the wall of said outlet space opposite said intercommunicating port, and there being a valve opening connecting said inlet chamber and said second compartment and a second outlet opening leading from said second compartment; a cylindric partition member rotatable on its axis and connecting said intercommunicating port with said first outlet opening, said partition member having a wall extending across said gate so as to isolate said first compartment from said second compartment and an opening adjacent said wall which will connect said second compartment with the interior of said cylindric partition member when the same is rotated on its axis; a check valve in said cylindric partition member to cooperate with said intercommunicating port to prevent a reverse flow through said intercommunicating port; valve means responding to relatively low temperature in said chamber to open said valve opening and responding to relatively high temperature in said chamber to close said opening; walls forming a bypass for the flow of oil from said inlet chamber to said intercommunicating port; and a temperature and pressure responsive valve device for said bypass normally closing said bypass and responding to low temperature and also to excess pressure differential between said inlet chamber and said intercommunicating port to open said bypass.

RAYMOND W. JENSEN.

REFERENCES CITED

The following references are of record in the file of this patent:

UNITED STATES PATENTS

| Number | Name | Date |
| --- | --- | --- |
| 86,381 | Evered | Feb. 2, 1869 |
| 986,184 | Lilly | Mar. 7, 1911 |
| 2,353,577 | Magrum | July 11, 1944 |
| 2,359,448 | Shaw | Oct. 3, 1944 |
| 2,396,053 | McEntire | Mar. 5, 1946 |
| 2,353,610 | Chisholm | July 11, 1944 |
| 2,291,637 | Kohlmann | Aug. 4, 1942 |
| 1,384,893 | Horine | July 19, 1921 |
| 494,569 | Howell | Apr. 4, 1893 |

FOREIGN PATENTS

| Number | Country | Date |
| --- | --- | --- |
| 546,452 | Great Britain | July 14, 1942 |
| 10,555 | Germany | Sept. 3, 1880 |